United States Patent
Michigami

(10) Patent No.: US 10,482,338 B2
(45) Date of Patent: Nov. 19, 2019

(54) IMAGE READING APPARATUS THAT ALIGNS DIRECTIONS OF DOCUMENT IMAGES, IMAGE READING METHOD, IMAGE FORMING APPARATUS, AND RECORDING MEDIUM

(71) Applicant: KYOCERA Document Solutions Inc., Osaka (JP)

(72) Inventor: Toru Michigami, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 83 days.

(21) Appl. No.: 15/833,538

(22) Filed: Dec. 6, 2017

(65) Prior Publication Data

US 2018/0165535 A1    Jun. 14, 2018

(30) Foreign Application Priority Data

Dec. 12, 2016   (JP) ................. 2016-240662

(51) Int. Cl.
| | |
|---|---|
| *G06K 9/03* | (2006.01) |
| *G06K 9/62* | (2006.01) |
| *H04N 1/04* | (2006.01) |
| *H04N 1/387* | (2006.01) |
| *G06K 9/32* | (2006.01) |
| *H04N 1/00* | (2006.01) |

(52) U.S. Cl.
CPC ............ *G06K 9/03* (2013.01); *G06K 9/3208* (2013.01); *G06K 9/6298* (2013.01); *H04N 1/00331* (2013.01); *H04N 1/04* (2013.01); *H04N 1/387* (2013.01); *H04N 1/3877* (2013.01); *G06K 2209/01* (2013.01); *G06K 2209/011* (2013.01); *H04N 2201/0094* (2013.01)

(58) Field of Classification Search
CPC .. G06K 9/03; G06K 9/20; G06K 9/32; G06K 9/6298; G06K 2209/01; G06K 2209/011; H04N 1/04; H04N 1/387
See application file for complete search history.

(56) References Cited

U.S. PATENT DOCUMENTS

| | | | |
|---|---|---|---|
| 6,721,451 B1 * | 4/2004 | Ishitani | G06K 9/00469 382/175 |
| 2013/0022272 A1 * | 1/2013 | Sun | G06K 9/3208 382/182 |

FOREIGN PATENT DOCUMENTS

| | | |
|---|---|---|
| JP | 11-15224 A | 1/1999 |
| JP | 2007-65864 A | 3/2007 |

* cited by examiner

*Primary Examiner* — Leon Flores
(74) *Attorney, Agent, or Firm* — Stein IP, LLC

(57) ABSTRACT

An image reading apparatus includes a character recognition processing unit, an incorrect recognition index calculator, a certainty calculator, a direction determining unit, and an image processing unit. The incorrect recognition index calculator calculates incorrect recognition indexes. The incorrect recognition index is set based on a count of incorrect recognition characters. The count of incorrect recognition characters is a count of candidates for characters possibly incorrectly recognized when the documents are read. The incorrect recognition index is set such that recognition certainty indicative of accuracy of the recognition becomes smaller as the count of incorrect recognition characters increases. The certainty calculator adjusts the recognition certainty using the incorrect recognition index. The direction determining unit that determines a direction of the documents based on the adjusted recognition certainty. The image processing unit corrects the image data based on the determined document direction to align image directions of the plurality of documents.

7 Claims, 5 Drawing Sheets

FIG. 5

Incorrect Recognition Index Database  141

| Record No. | Recognition Target | Incorrect Recognition Index | Candidate for Incorrect Recognition | Specific Candidate for Incorrect Recognition |
|---|---|---|---|---|
| 1 | あ(A) | 1 | お(O) | |
| 2 | い(I) | 2 | こ(Ko) り(Ri) | こ(Ko) |
| 3 | う(U) | 4 | く(Ku) し(Si) つ(Tu) へ(He) | く(Ku) し(Si) へ(He) |
| 4 | え(E) | 1 | | |
| 5 | お(O) | 1 | あ(A) | |
| 6 | か(Ka) | 1 | | |
| 7 | き(Ki) | 1 | さ(Sa) | |
| 8 | く(Ku) | 4 | し(Si) つ(Tu) へ(He) う(U) | つ(Tu) へ(He) う(U) |
| 9 | け(Ke) | 1 | | |
| 10 | こ(Ko) | 3 | り(Ri) い(I) | り(Ri) い(I) |
| 11 | さ(Sa) | 1 | き(Ki) | |
| 12 | し(Si) | 4 | つ(Tu) へ(He) う(U) く(Ku) | つ(Tu) へ(He) う(U) |
| 13 | す(Su) | 1 | | |
| 14 | せ(Se) | 1 | | |
| 15 | そ(So) | 1 | て(Te) | |
| 16 | た(Ta) | 1 | | |
| 17 | ち(Ti) | 1 | ら(Ra) | |
| 18 | つ(Tu) | 4 | へ(He) う(U) く(Ku) し(Si) | し(Si) く(Ku) へ(He) |
| 19 | て(Te) | 1 | そ(So) | |
| 20 | と(To) | 1 | | |

IMAGE READING APPARATUS THAT ALIGNS DIRECTIONS OF DOCUMENT IMAGES, IMAGE READING METHOD, IMAGE FORMING APPARATUS, AND RECORDING MEDIUM

INCORPORATION BY REFERENCE

This application is based upon, and claims the benefit of priority from, corresponding Japanese Patent Application No. 2016-240662 filed in the Japan Patent Office on Dec. 12, 2016, the entire contents of which are incorporated herein by reference.

BACKGROUND

Unless otherwise indicated herein, the description in this section is not prior art to the claims in this application and is not admitted to be prior art by inclusion in this section.

If incorrect collating occurs in a direction of a plurality of documents when the documents are set on an automatic document feeder (an ADF) for continuous scanning, copying the documents without correction and automatically executing a bookbinding process cause a big problem. Against such problem, for example, there has been proposed the following technique. The technique recognizes characters in several kinds of character regions in documents in respective directions of 0 degrees, 90 degrees, 180 degrees, and 270 degrees. The technique determines a direction with the highest degree of confidence (a degree of approximation between the read character and the recognized character) among degrees of confidence of the character recognition in the respective directions as a document direction. Meanwhile, a technique that makes a process to determine a direction of images efficient has also been proposed. This technique, specifically, recognizes characters in one direction based on a direction of documents up to the previous page or the most frequent direction of the documents from the first page to the previous page to determine the direction of the documents of the second page and after the second page. When an approximate value (closeness of a feature of a vector by collation with vector information of each character) as a result of the character recognition is equal to or more than a threshold, the technique determines that the direction of the documents matches. Note that, when the approximate value is less than the threshold, the technique recognizes the characters also in another direction and determines a direction in which the highest reliable recognition result is obtained as the direction of the documents.

SUMMARY

An image reading apparatus according to one aspect of the disclosure reads images on a plurality of documents to create image data. The image reading apparatus includes a character recognition processing unit, an incorrect recognition index calculator, a certainty calculator, a direction determining unit, and an image processing unit. The character recognition processing unit recognizes characters in at least one of a plurality of directions. The characters are expressed by the created image data. The incorrect recognition index calculator calculates incorrect recognition indexes. The incorrect recognition index is set based on a count of incorrect recognition characters. The count of incorrect recognition characters is a count of candidates for characters possibly incorrectly recognized when the documents are read. The incorrect recognition index is set such that recognition certainty indicative of accuracy of the recognition becomes smaller as the count of incorrect recognition characters increases. The certainty calculator adjusts the recognition certainty using the incorrect recognition index. The direction determining unit that determines a direction of the documents based on the adjusted recognition certainty. The image processing unit corrects the image data based on the determined document direction to align image directions of the plurality of documents.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 5 illustrates a table showing contents of an incorrect recognition index database according to the one embodiment.

DETAILED DESCRIPTION

Figure 1:
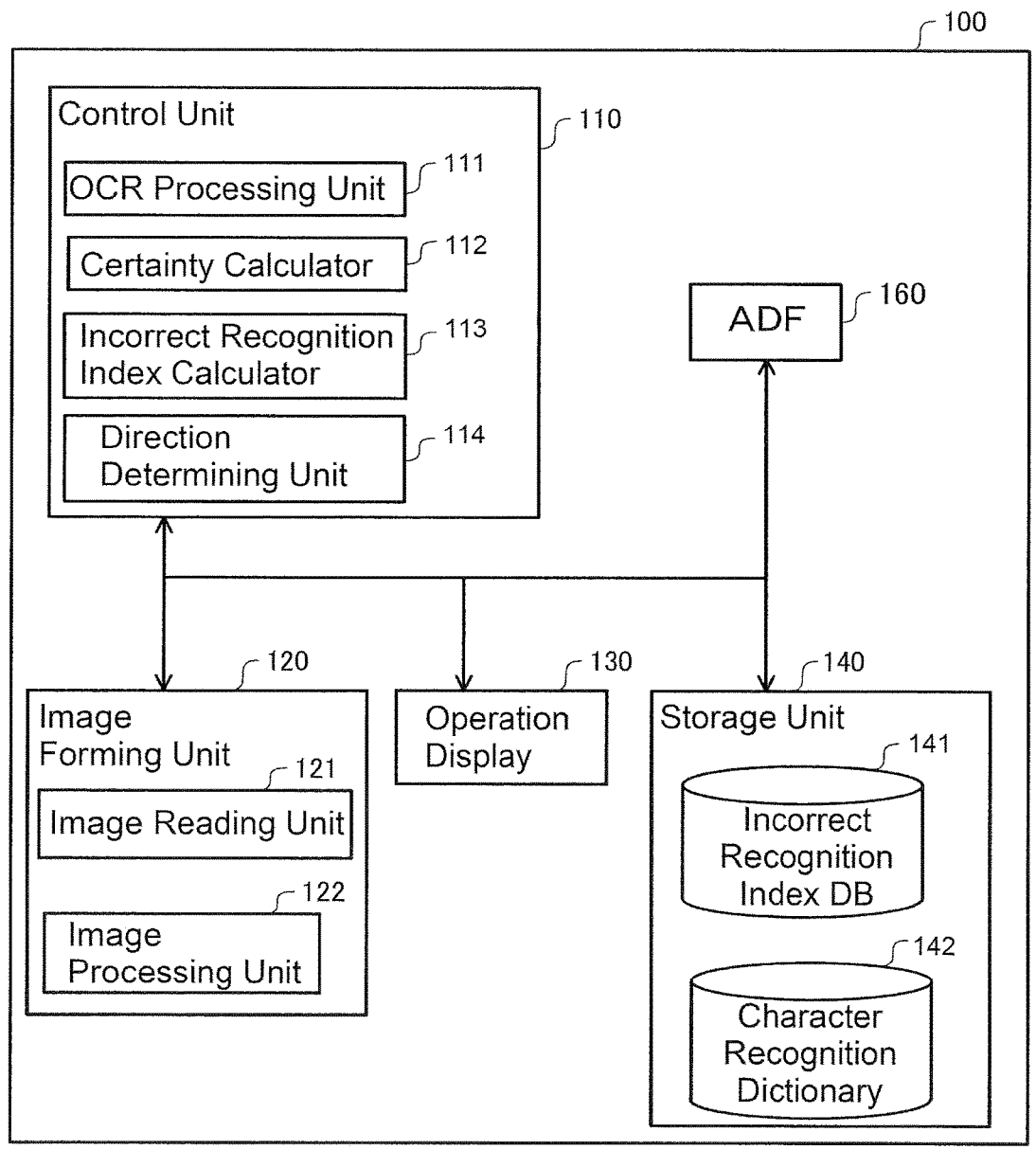
FIG. 1 illustrates a block diagram illustrating a functional configuration of an image forming apparatus according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes a configuration for implementing the disclosure (hereinafter referred to as "embodiment") with reference to the drawings.

FIG. 1 illustrates a block diagram illustrating a functional configuration of an image forming apparatus 100 according to one embodiment of the disclosure. The image forming apparatus 100 includes a control unit 110, an image forming unit 120, an operation display 130, a storage unit 140, and an automatic document feeder (an ADF) 160. The control unit 110 includes an OCR processing unit 111 (also referred to as a character recognition processing unit), a certainty calculator 112, an incorrect recognition index calculator 113, and a direction determining unit 114. The image forming unit 120 includes an image reading unit 121, which reads an image from a document to create image data, and an image processing unit 122 to form the image on print mediums.

The control unit 110 includes a main storage unit such as a RAM and a ROM and a control unit such as a Micro Processing Unit (an MPU) and a Central Processing Unit (CPU). The control unit 110 has a controller function related to an interface such as various I/Os, a Universal Serial Bus (a USB), a bus, and other hardware to control the entire image forming apparatus 100.

The storage unit 140 is a storage device formed of a non-transitory recording medium such as a hard disk drive and a flash memory to store control programs and data for processes executed by the control unit 110. The storage unit 140 further stores an incorrect recognition index database 141 and a character recognition dictionary 142. The character recognition dictionary 142 is a character recognition dictionary used to determine a direction of the documents.

Figure 2:
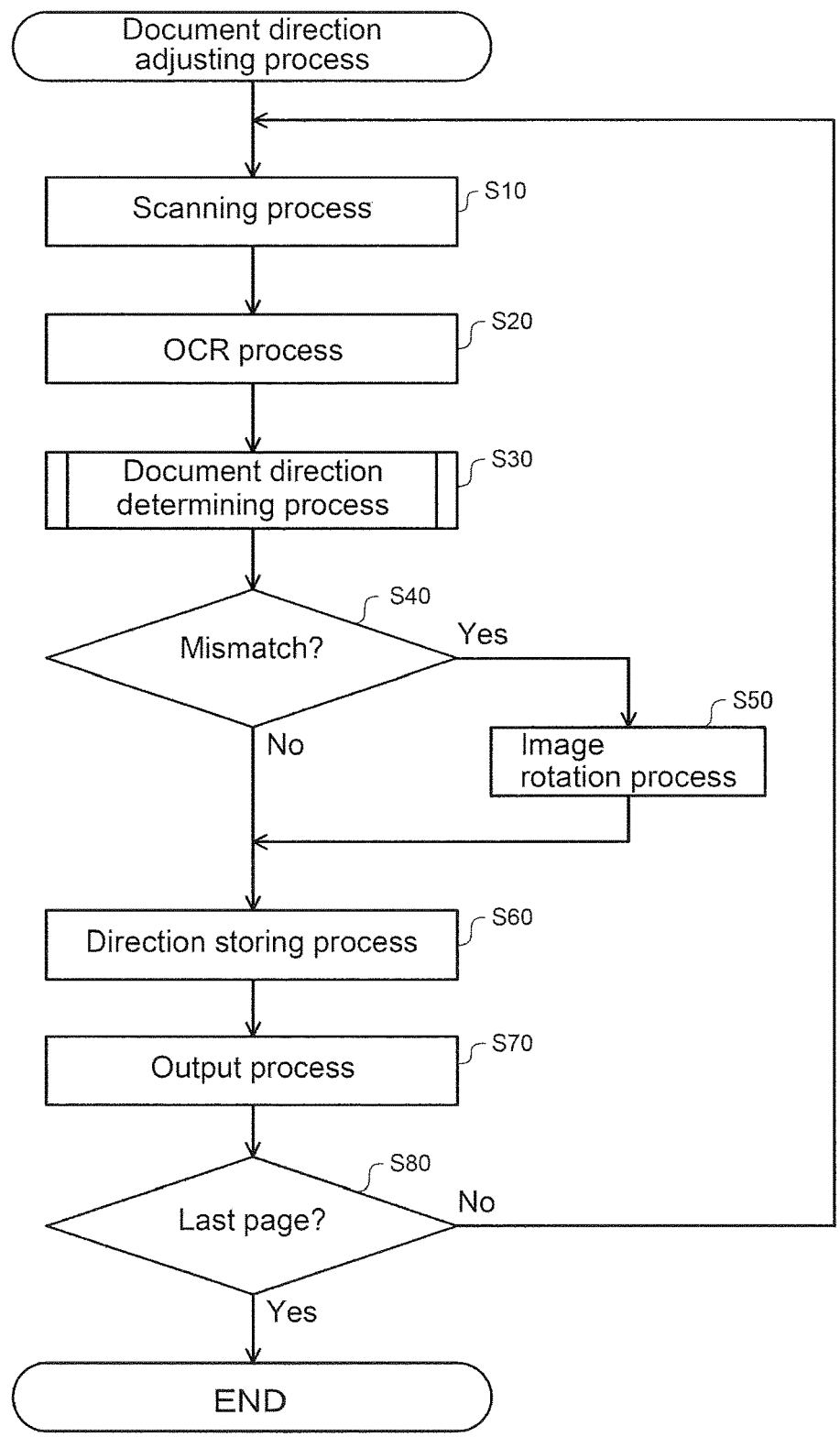
FIG. 2 illustrates contents of a document direction adjusting process according to the one embodiment.

FIG. 2 illustrates contents of a document direction adjusting process according to the one embodiment. The document direction adjusting process is a process that aligns directions of the images even if incorrect collating occurs in the documents when the images on the plurality of documents are read using the ADF 160 and forms the images on the print mediums. The document direction adjusting process is not necessarily limited to the case of forming the images on the print mediums but is also applicable to create image data with a plurality of pages.

At Step S10, a user executes a scanning process. In the scanning process, the user sets the plurality of documents on the ADF 160 and presses a start button (not illustrated) on the operation display 130.

At Step S20, the OCR processing unit 111 executes the character recognition process (an OCR process) using the character recognition dictionary 142. In the character recognition process, the OCR processing unit 111 assumes that the direction of the documents is unknown, and executes the character recognition process in four directions, 0 degrees, 90 degrees, 180 degrees, and 270 degrees. The character recognition process is executed to identify the direction of the documents. This is because that, a direction of characters matches the direction of the documents.

At Step S30, the control unit 110 executes a document direction determining process. The document direction determining process is a process to determine relative consistency of the document direction using the character recognition process. In this embodiment, the character recognition process employs a method of recognition using a feature vector.

Figure 3:
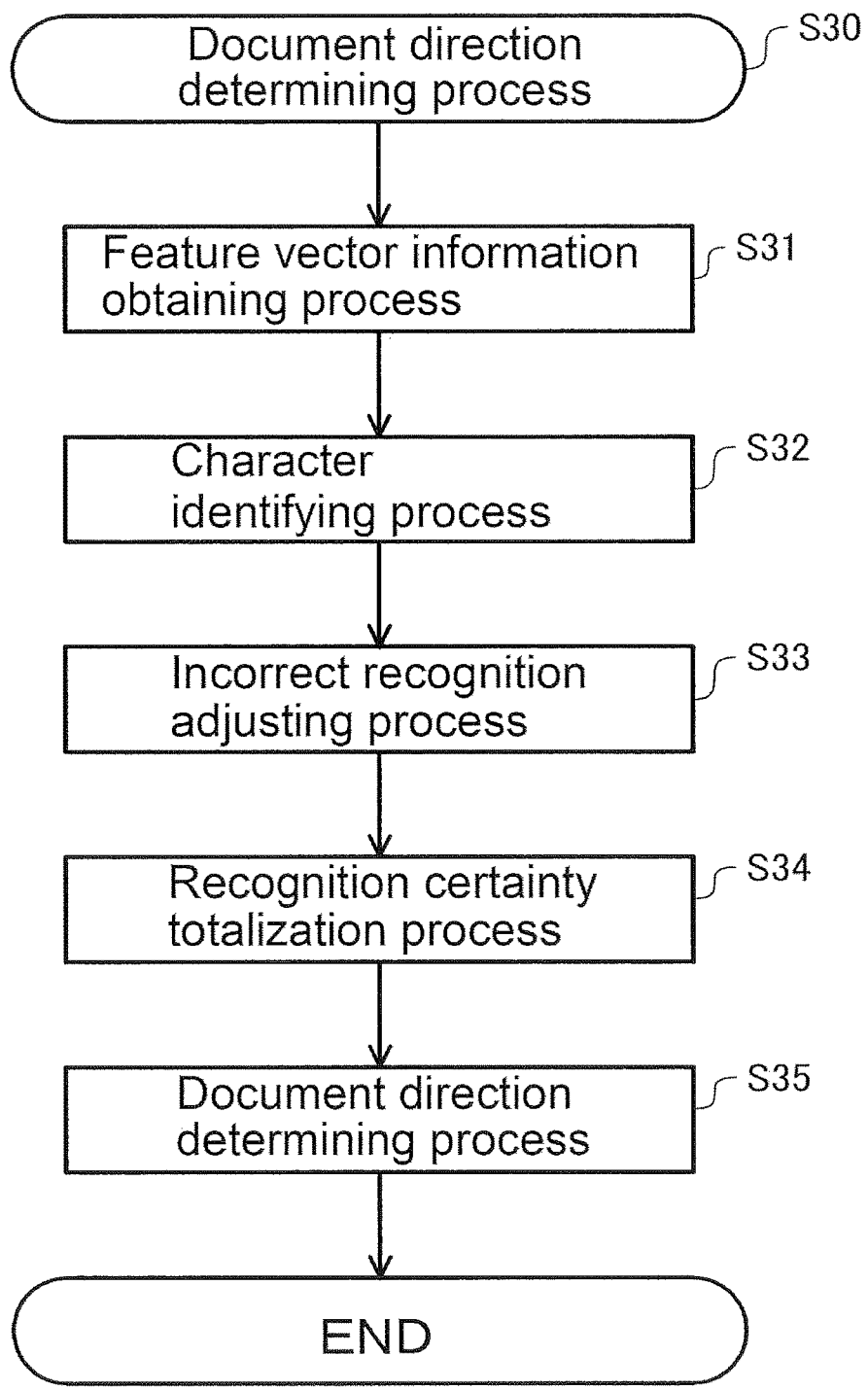
FIG. 3 illustrates contents of a document direction determining process according to the one embodiment.

FIG. 3 illustrates contents of the document direction determining process according to the one embodiment. At Step S31, the OCR processing unit 111 executes a feature vector information obtaining process. In the feature vector information obtaining process, the OCR processing unit 111 obtains feature vector information from respective elements of characters as a recognition target. The one embodiment employs Japanese Hiragana (Japanese syllabary characters) as one example of the characters. Meanwhile, the disclosure is applicable to characters from which the feature vector information is obtainable.

Figure 4:
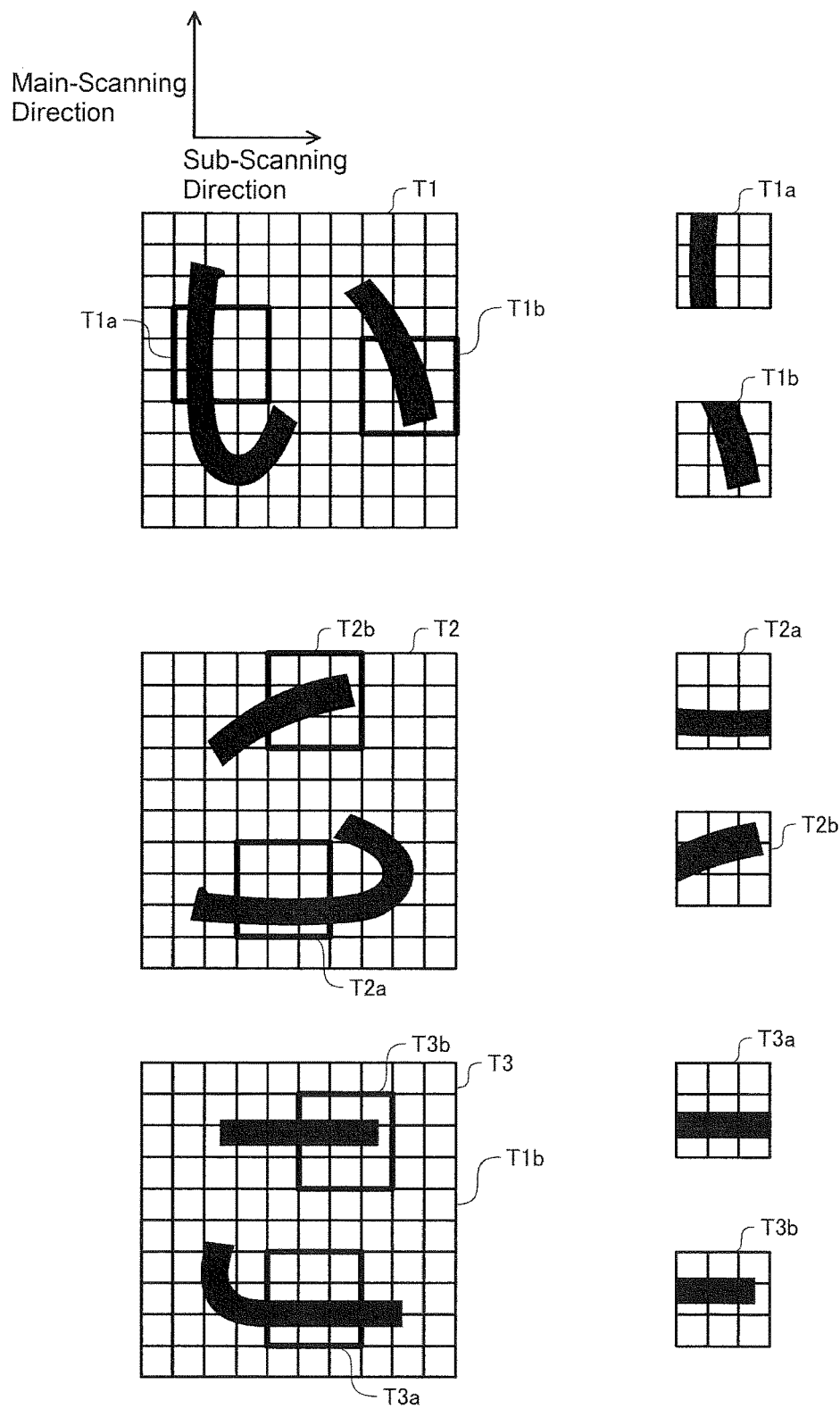
FIG. 4 illustrates an explanatory view illustrating contents of a feature vector information obtaining process according to the one embodiment.

FIG. 4 illustrates an explanatory view illustrating contents of the feature vector information obtaining process according to the one embodiment. FIG. 4 illustrates a state of obtaining the feature vector information of Hiragana "I," as a recognition target (see Record No. 2 in FIG. 5 described later). The OCR processing unit 111 detects the successive black pixels as a character and extracts a region including the one character constituted of the black pixels by rectangle. In this example, the OCR processing unit 111 extracts M×N (for example, 10×10) pixel block T1 including the image of "I."

The OCR processing unit 111 detects a distribution direction of the black pixels as the feature vector information using a window of 3×3 pixels in the pixel block T1. In this example, the OCR processing unit 111 can obtain the feature vector information in a main-scanning direction from a window T1a and obtain the feature vector information in the main-scanning direction slightly inclined in a sub-scanning direction from a window T1b. The OCR processing unit 111 can obtain the feature vector information from 64 pieces of windows including the two windows T1a and T1b.

At Step S32, the OCR processing unit 111 executes a character identifying process. In the character identifying process, the OCR processing unit 111 compares the obtained feature vector information with the feature vector information for the respective characters stored in the character recognition dictionary 142 to identify a character of the highest match as the recognized character. The certainty calculator 112 quantifies the consistency at this time as recognition certainty, which has a range of 0 to 1.0 indicative of accuracy of the recognition. The recognition certainty in this example is 0.8.

At Step S33, the certainty calculator 112 executes an incorrect recognition adjusting process. In the incorrect recognition adjusting process, the certainty calculator 112 adjusts the recognition certainty assuming incorrect recognition caused by a difference between the direction of the documents and a direction assumed by the character recognition.

Specifically, for example, it is assumed that, if the pixel block T1 including "I" is inclined anticlockwise by 90 degrees, the OCR processing unit 111 extracts the rotated "I" as a pixel block T2. The OCR processing unit 111 obtains the feature vector information from 64 pieces of windows including two windows T2a and T2b.

In this case, since the OCR processing unit 111 executes the character recognition assuming that the pixel block T2 is not inclined, the OCR processing unit 111 possibly incorrectly recognizes the feature vector information obtained from the pixel block T2 as a pixel block T3 including Hiragana "Ko" (see Record No. 10 in FIG. 5 described later), and then recognizes the character as "Ko." This is because, for example, the feature vectors obtained from the two windows T2a and T2b are probably determined as close to the feature vectors of two windows T3a and T3b in the pixel block T3, respectively.

In this case, the certainty calculator 112 assumes the two cases: Hiragana "I" and Hiragana "Ko" rotated anticlockwise by 90 degrees, and changes the recognition certainty of 0.8 to 0.4, which is an approximately half of 0.8, in the incorrect recognition adjusting process. This is because that, in the incorrect recognition of "Ko," the determination of the direction is incorrectly determined as the direction of the documents displaced by 90 degrees.

FIG. 5 illustrates a table showing contents of an incorrect recognition index database 141 according to the one embodiment. The incorrect recognition index database 141 is a database that groups a plurality of different characters possibly incorrectly recognized as identical characters when rotated. The incorrect recognition index database 141 includes a "recognition target," an "incorrect recognition index," a "candidate for incorrect recognition," and a "specific candidate for incorrect recognition" as a field (a row). The incorrect recognition index calculator 113 calculates the incorrect recognition index using the incorrect recognition index database 141.

The recognition target means an image of a character on a document as the recognition target. The candidate for incorrect recognition is a candidate for a character possibly incorrectly recognized when the recognition target is recognized. The specific candidate for incorrect recognition is a candidate for a character possibly incorrectly recognized caused by the rotation of the document among the candidates for incorrect recognition. The specific candidate for incorrect recognition results in an incorrect determination of the document direction caused by the incorrect recognition. Meanwhile, with the candidates for incorrect recognition not relevant to the specific candidate for incorrect recognition, the incorrect recognition does not become the cause of the incorrect determination of the document direction.

In this embodiment, the incorrect recognition index is an index indicative of a level of the possibility of incorrect determination of the document direction caused by the incorrect recognition due to the rotation of the document. In this example, the incorrect recognition index is set based on the count of incorrect recognition characters, which is a count of candidates for characters possibly incorrectly recognized caused by the rotation of the document (namely, the specific candidate for incorrect recognition). The incorrect recognition index is set as addition of 1 to the count of incorrect recognition characters (that is, incorrect recognition index=count of incorrect recognition characters+1). Specifically, since the count of incorrect recognition characters, which is the count of the specific candidates for incorrect recognition, of the record No. 1, Hiragana "A," is zero, the incorrect recognition index is calculated as 1. Meanwhile, since the count of incorrect recognition characters, which is the count of specific candidates for incorrect recognition, of the record No. 2, Hiragana "I," is 1, the incorrect recognition index is calculated as 2.

Specifically, "I" in the record No. 2 has Hiraganas "Ko" and "RI" as the candidates for incorrect recognition. However, even if "I" is incorrectly recognized as "RI," this does not result in the incorrect determination of the document direction; therefore, only "Ko" is included in the specific candidate for incorrect recognition. Accordingly, for example, even if "I" is recognized with the recognition certainty of 0.8, the document direction has two possibilities, a direction determined by the recognition of "I" and a direction determined by the recognition of "Ko." Accordingly, the incorrect recognition index is calculated as 2. In the incorrect recognition adjusting process, the certainty calculator 112 divides the recognition certainty by the incorrect recognition index to adjust the recognition certainty to 0.4 (that is, recognition certainty after adjustment=recognition certainty before adjustment/incorrect recognition index).

Furthermore, "A" in the record No. 1 has "O" as the candidate for incorrect recognition. However, even if "O" is incorrectly recognized, since this does result in the incorrect determination of the document direction, there is no specific candidate for incorrect recognition. Accordingly, for example, even if "A" is determined as any of "A" and "O," which are recognized with the recognition certainty of 0.6, the identical direction is determined. Accordingly, the incorrect recognition index is calculated as 1. In the incorrect recognition adjusting process, the certainty calculator 112 causes the recognition certainty to remain to be 0.6.

Furthermore, as another example, the following describes examples of "Ku" in the record No. 8 and "E" in the record No. 4 both of which have the recognition certainty of 0.9. Since the incorrect recognition index of "Ku" is 4, the recognition certainty is adjusted to be 0.2. Meanwhile, since the incorrect recognition index of "E" is 1, the recognition certainty remains to be 0.9. Note that, the incorrect recognition index is not necessarily limited to the use as the inverse proportion formula when the recognition certainty is adjusted. For example, the incorrect recognition index calculator 113 may execute calculation such that the recognition certainty becomes smaller as the count of incorrect recognition characters increases according to the property of the image forming apparatus 100 using a nonlinear conversion curve.

At Step S34, the direction determining unit 114 executes a recognition certainty totalization process. In the recognition certainty totalization process, the certainty calculator 112 totalizes the preset recognition certainties of the plurality of characters. At Step S35, the direction determining unit 114 determines a direction with the largest totalized recognition certainty as the direction of the documents.

At Step S40, the direction determining unit 114 performs comparison with the direction of the previous document for consistency of direction. When the directions match, the direction determining unit 114 advances the process to Step S60, and when the directions mismatch, the direction determining unit 114 advances the process to Step S50. When the document is the first document, the direction determining unit 114 regards that the direction matches and advances the process to Step S60.

At Step S50, the image processing unit 122 executes an image rotation process. In the image rotation process, the image processing unit 122 corrects the image data such that the direction matches with the direction of the previous document (the direction after correction when a correction process is executed) and rotates the image. This aligns the image directions of the image data on the plurality of documents in one direction. At Step S60, the direction determining unit 114 stores the direction of the documents after the rotation process. The direction determining unit 114 uses the stored direction of the documents for comparison with the direction of the next document for consistency.

At Step S70, the image forming unit 120 executes an output process. In the output process, the image forming unit 120 forms the images on the print mediums based on the image data after the rotation process. The processes of Step S10 to Step S70 are repeatedly executed up to the last page (Step S80).

Thus, the image forming apparatus 100 according to the one embodiment can determine the direction of the documents using the incorrect recognition index, which indicates the level of possibility of the incorrect determination of the document direction occurred by the incorrect recognition caused by the rotation of the documents. This ensures achieving at least one of a reduction in the calculation process and improvement in the recognition accuracy assuming the possibility of the incorrect recognition caused by the rotation of the documents.

The disclosure can be embodied by the following modifications in addition to the above-described embodiment.

Modification 1

While in the embodiment, the count of incorrect recognition characters indicates the count of candidates for the characters possibly incorrectly recognized caused by the rotation of the documents (namely, the specific candidates for incorrect recognition), the count of incorrect recognition characters may be the count of candidates for characters possibly incorrectly recognized focusing on only the accuracy of the recognition, regardless of the presence/absence of the rotation of the documents (namely, the candidates for incorrect recognition).

Modification 2

While the embodiment determines the incorrect recognition index based on only the count of incorrect recognition characters as the count of specific candidates for incorrect recognition, the incorrect recognition index needs not to be necessarily determined based on only the count of incorrect recognition characters. The incorrect recognition index, for example, may be determined based on a position of the character as the recognition target on a document.

Specifically, the image forming apparatus may be configured such that the incorrect recognition index is increased when the characters as the recognition target are present in preset specific regions, for example, in a range of within 10 mm from page ends of the respective documents. This configuration assumes that there may be a case where, for example, page numbers and chapter titles are written on peripheral ends on respective pages and differ from the character direction of the body text. Furthermore, the image forming apparatus may significantly increase the incorrect recognition indexes of the characters in a preset specific range such that the recognition results can be ignored.

Modification 3

While in the embodiment, the incorrect recognition index is the value of one or more increased according to the increase in the count of the specific candidates for incorrect recognition, the value may be less than 1. Specifically, for example, when "I" in the record No. 2 is recognized as "I" in the recognition process in a predetermined direction and is recognized as "Ko" as assumed in the recognition process in a direction inclined anticlockwise by 90 degrees, to enhance the recognition certainty of "I" in the recognition process in the predetermined direction, the incorrect recognition index can be a value of less than 1. Thus, when the incorrect recognition is executed caused by the rotation of the documents as preliminary assumed, the incorrect recognition index may be set such that the recognition certainty becomes large.

Modification 4

While the embodiment executes the character recognition process in the four directions, 0 degrees, 90 degrees, 180 degrees, and 270 degrees and determines the direction of the largest recognition certainty as the direction of the documents, the character recognition process needs not necessary to be executed in the four directions. Specifically, for example, with the A4-sized rectangular documents, it is only necessary to execute the character recognition process in the two directions, 0 degrees and 180 degrees. This is because that, it may be regarded that the incorrect collating where documents are displaced in a 90 degree-direction and a 270 degree-direction does not factually occur in the rectangular documents. Thus, it is only necessary to recognize the image on the document in at least one direction among the plurality of directions.

Furthermore, since the incorrect collating often occurs in a part of documents, for example, a method disclosed in Japanese Unexamined Patent Application Publication No. 2007-065864 may be employed. This method executes character recognition in one direction based on a direction of documents up to previous pages or the most frequent direction of the documents from the first page to the previous page. The method determines whether the direction of the documents match or not by whether recognition certainty as a result of the character recognition being equal to or more than a threshold.

Modification 5

While the embodiment assumes the case where the plurality of documents are read using the automatic document feeder (ADF) 160, the operation is not limited to this. The disclosure is also applicable to the case where the user sequentially places the plurality of documents on a platen by hand. Accordingly, the image forming apparatus can align the directions of the document images even if the user mistakenly places the documents.

Modification 6

While in the embodiment, the disclosure is applied to the image forming apparatus, the disclosure is also applicable to an image reading apparatus.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image reading apparatus for reading images on a plurality of documents to create image data, the image reading apparatus comprising:
    a character recognition processing unit that recognizes characters in at least one of a plurality of directions, the characters being expressed by the created image data;
    an incorrect recognition index calculator that calculates incorrect recognition indexes, the incorrect recognition index being set based on a count of incorrect recognition characters, the count of incorrect recognition characters being a count of candidates for characters possibly incorrectly recognized when the plurality of documents are read, the incorrect recognition index being set such that recognition certainty indicative of accuracy of the recognition becomes smaller as the count of incorrect recognition characters increases;
    a certainty calculator that adjusts the recognition certainty using the incorrect recognition index;
    a direction determining unit that determines a direction of the plurality of documents based on the adjusted recognition certainty; and
    an image processing unit that corrects the image data based on the determined document direction to align image directions of the plurality of documents;
    wherein the certainty calculator divides the recognition certainty by the incorrect recognition index for the adjustment.

2. The image reading apparatus according to claim 1, wherein the count of incorrect recognition characters is a count of candidates for characters possibly incorrectly recognized caused by a rotation of the plurality of documents when the plurality of documents are read.

3. The image reading apparatus according to claim 1, wherein when a character target for the recognition is present in a preset specific region in the plurality of documents, the incorrect recognition index calculator adjusts the incorrect recognition index such that the recognition certainty decreases.

4. The image reading apparatus according to claim 1, wherein when a character target for the recognition is incorrectly recognized as preliminary assumed caused by a rotation of the plurality of documents, the incorrect recognition index calculator adjusts the incorrect recognition index such that the recognition certainty increases.

5. An image forming apparatus comprising:
    the image reading apparatus according to claim 1; and
    an image forming unit that forms the images on print mediums based on the image data where image directions of the plurality of documents are aligned.

6. An image reading method for reading images on a plurality of documents to create image data, the image reading method comprising:

recognizing characters in at least one of a plurality of directions, the characters being expressed by the created image data;

calculating incorrect recognition indexes, the incorrect recognition index being set based on a count of incorrect recognition characters, the count of incorrect recognition characters being a count of candidates for characters possibly incorrectly recognized when the plurality of documents are read, the incorrect recognition index being set such that recognition certainty indicative of accuracy of the recognition becomes smaller as the count of incorrect recognition characters increases;

adjusting the recognition certainty using the incorrect recognition index;

determining a direction of the plurality of documents based on the adjusted recognition certainty; and correcting the image data based on the determined document direction to align image directions of the plurality of documents;

wherein the adjusting of the recognition certainty comprises dividing the recognition certainty by the incorrect recognition index for the adjustment.

7. A non-transitory computer-readable recording medium that stores an image reading program for controlling an image reading apparatus for reading images on a plurality of documents to create image data, the image reading program causing the image reading apparatus to function as:

a character recognition processing unit that recognizes characters in at least one of a plurality of directions, the characters being expressed by the created image data;

an incorrect recognition index calculator that calculates incorrect recognition indexes, the incorrect recognition index being set based on a count of incorrect recognition characters, the count of incorrect recognition characters being a count of candidates for characters possibly incorrectly recognized when the plurality of documents are read, the incorrect recognition index being set such that recognition certainty indicative of accuracy of the recognition becomes smaller as the count of incorrect recognition characters increases;

a certainty calculator that adjusts the recognition certainty using the incorrect recognition index;

a direction determining unit that determines a direction of the plurality of documents based on the adjusted recognition certainty; and an image processing unit that corrects the image data based on the determined document direction to align image directions of the plurality of documents;

wherein the certainty calculator divides the recognition certainty by the incorrect recognition index for the adjustment.

* * * * *